US012726497B2

(12) United States Patent
Chen et al.

(10) Patent No.: US 12,726,497 B2
(45) Date of Patent: Sep. 1, 2026

(54) METHOD, PRODUCT, AND SYSTEM FOR AUTOMATICALLY ISOLATING MALICIOUS SECURITY ALERTS FROM BENIGN ALERTS USING AN ENSEMBLE MODEL OF PATTERN RECOGNITION TECHNIQUES

(71) Applicant: Vectra AI, Inc., San Jose, CA (US)

(72) Inventors: Hsin Chen, San Jose, CA (US); Himanshu Mhatre, Mountain View, CA (US); Irina Javed, Mountain View, CA (US); Daniel Carlton Hannah, Melrose, MA (US)

(73) Assignee: Vectra AI, Inc., San Jose, CA (US)

( * ) Notice: Subject to any disclaimer, the term of this patent is extended or adjusted under 35 U.S.C. 154(b) by 0 days.

(21) Appl. No.: 18/525,672

(22) Filed: Nov. 30, 2023

(65) Prior Publication Data

US 2024/0195827 A1 Jun. 13, 2024

Related U.S. Application Data

(60) Provisional application No. 63/431,411, filed on Dec. 9, 2022.

(51) Int. Cl.
*H04L 29/06* (2006.01)
*H04L 9/40* (2022.01)

(52) U.S. Cl.
CPC ................................ *H04L 63/1425* (2013.01)

(58) Field of Classification Search
CPC ........................ H04L 63/1425; H04L 63/1408
See application file for complete search history.

(56) References Cited

U.S. PATENT DOCUMENTS 11,005,862 B1 * 5/2021 Comeaux ............ H04L 63/1416
2018/0227322 A1 * 8/2018 Luo ..................... H04L 63/1425
2019/0052665 A1 * 2/2019 Mahieu ............... H04L 63/1433
(Continued)

FOREIGN PATENT DOCUMENTS

WO WO 2024/124248 6/2024

OTHER PUBLICATIONS

PCT International Search Report and Written Opinion for International Appln. No. PCT/US2023/083443, Applicant Vectra AI, Inc., dated Apr. 16, 2024.

(Continued)

*Primary Examiner* — Ka Shan Choy
(74) *Attorney, Agent, or Firm* — Vista IP Law Group, LLP

(57) ABSTRACT

Disclosed is an improved approach for managing security alerts to automatically isolate malicious security alerts from benign alerts using an ensemble model of pattern recognition techniques. In some embodiments, the approach provides for automatically isolating security alerts of malicious attack from security alerts that correspond to undesirable, yet benign, activity in computer networks, cloud infrastructures and SAAS applications. Specifically, the approach provides for qualitative contextual assessments of these alerts using an ensemble of models. These ensemble models leverage a history of security events on a computer network, cloud infrastructure and SAAS applications to determine a level of relevance for received alerts and determine, based on that level of relevance, how or if they should be presented to an administrator.

20 Claims, 7 Drawing Sheets

(56) References Cited

U.S. PATENT DOCUMENTS

| | | | | |
|---|---|---|---|---|
| 2020/0125728 | A1* | 4/2020 | Savir | G06F 21/554 |
| 2020/0329062 | A1* | 10/2020 | Beauchesne | H04L 63/105 |
| 2022/0070195 | A1* | 3/2022 | Sern | G06F 21/552 |
| 2022/0377111 | A1* | 11/2022 | Liao | H04L 43/067 |
| 2022/0385674 | A1* | 12/2022 | Donbosco | G06N 5/04 |
| 2023/0208870 | A1* | 6/2023 | Yellapragada | H04L 63/20<br>726/22 |

OTHER PUBLICATIONS

PCT International Preliminary Report for Patentability for International Appln. No. PCT/US2023/083443, Applicant Vectra AI, Inc., dated Jun. 10, 2025.

Lin, H., et al., "Ensemble Learning for Threat Classification in Network Intrusion Detection on a Security Monitoring System for Renewable Energy," Appl. Sci. 2021, 11, 11283. https://doi.org/10.3390/app112311283, dated Nov. 2021.

Gheni, H., et al., "Using Ensemble Techniques Based on Machine and Deep Learning for Solving Intrusion Detection Problems: A Survey Solving Intrusion Detection Problems: A Survey," Karbala International Journal of Modern Science, Iss. 1, Article 5., dated 2023.

Agate, V., et al., "A Behavior-Based Intrusion Detection System Using Ensemble Learning Techniques," ITASEC'22: Italian Conference on Cybersecurity, Jun. 20-23, 2022, Rome, Italy.

Arqane, A., et al., "Intrusion Detection System using Ensemble Learning Approaches: A Systematic Literature Review," iJOE, vol. 18, No. 13, 2022.

* cited by examiner

METHOD, PRODUCT, AND SYSTEM FOR AUTOMATICALLY ISOLATING MALICIOUS SECURITY ALERTS FROM BENIGN ALERTS USING AN ENSEMBLE MODEL OF PATTERN RECOGNITION TECHNIQUES

CONTINUITY INFORMATION

This disclosure is a continuation of U.S. Provisional App. Ser. No. 63/431,411 entitled "METHOD, PRODUCT, AND SYSTEM FOR AUTOMATICALLY ISOLATING MALICIOUS SECURITY ALERTS FROM BENIGN ALERTS USING AN ENSEMBLE MODEL OF PATTERN RECOGNITION TECHNIQUES," filed on Dec. 9, 2022. The content of the aforementioned U.S. patent application is hereby explicitly incorporated by reference for all purposes.

BACKGROUND

Understanding the network environment and the interaction between entities is crucial to guarding the security of the network. There are several reasons that cause this task to be very difficult. For instance, as the volume of network traffic has exploded so has the amount of data corresponding to activities associated with security risks and breaches. Unfortunately, this has made it difficult for security professionals and others to keep up with the massive workload required to monitor networks Threat detection platforms used to monitor networks are continually plagued with a constant flow of security events alerting cybersecurity threat responders with unsanctioned behavior in their computer networks, cloud infrastructure, and software as a service (SAAS) applications. Many of these alerts, while legitimate cases of undesirable behavior, might not in actuality be part of an active attack campaign from an adversary. Thus, these alerts can pose a serious distraction for responders whose first priority is to stop advancement of active threats. However, separating alerts corresponding to an actual threat from alerts corresponding to an undesirable but yet benign behavior traditionally requires a human expert with strong domain familiarity which can be a very resource intensive process.

For example, there are enormous numbers of entities (accounts/hosts/services) within networks interacting with each other. Many of these interactions may be normal and not otherwise correspond to undesirable behavior. In fact, in most networks a vast amount of interaction correspond to undesirable but not otherwise malicious behavior (e.g., benign behavior). However, it is likely that at least some of these interactions correspond to malicious behavior (e.g., data theft related activities). In order to detect the malicious behavior most systems implement monitoring protocols that generate alerts which a security professional (e.g., an administrator) can review to identify both undesirable and malicious behavior.

Unfortunately, the massive number of alerts that most systems generate make it hard to identify malicious behavior (e.g., active threats) from the undesirable behavior. The traditional approach to address this issue is to have an administrator make a whitelist or rule to automatically ignore alerts corresponding to undesirable behavior. This is at best time consuming and at worst can contribute to type-I and type-II labeling errors.

Thus, what is needed is a way to enable administrators to more efficiently and informatively perform detection of malicious behavior in a network.

SUMMARY

In some embodiments, the approach provides for automatically isolating security alerts of malicious attack from security alerts that correspond to undesirable, yet benign, activity in computer networks, cloud infrastructures and software as a service (SAAS) applications. Specifically, the approach(es) included herein provide for qualitative contextual assessments of these alerts using an ensemble of models. These ensemble models leverage a history of security events on a computer network, cloud infrastructure, and SAAS applications to determine a level of relevance for received alerts and determine, based on that level of relevance, how or if they should be presented to an administrator.

Further details of aspects, objects, and advantages of some embodiments are described below in the detailed description, drawings, and claims. Both the foregoing general description and the following detailed description are exemplary and explanatory and are not intended to be limiting as to the scope of the embodiments.

BRIEF DESCRIPTION OF THE DRAWINGS

The drawings illustrate the design and utility of some embodiments of the present invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. These drawings depict only typical embodiments of the invention and are not therefore to be considered limiting of its scope, the invention will be described and explained with additional specificity and detail using the accompanying drawings.

DETAILED DESCRIPTION

Figure 1:
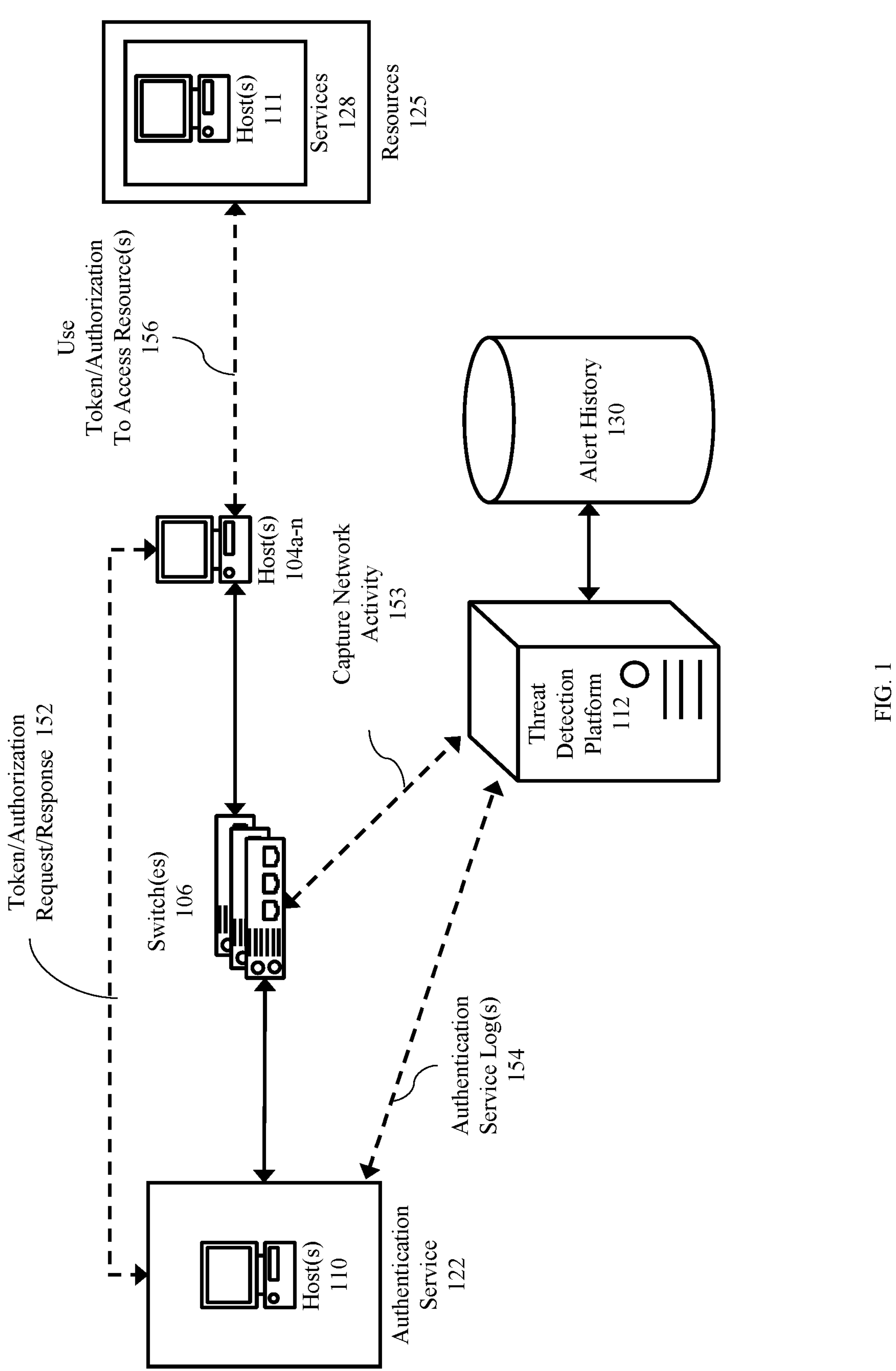
FIG. 1 illustrates an example environment(s) in which some embodiments of the invention are implemented.

Various embodiments of the invention are directed to a method, product, and system for automatically isolating security alerts of malicious attack from security alerts that correspond to undesirable, yet benign, activity in computer networks, cloud infrastructures, and software as a service (SAAS) applications.

According to some embodiments, the approach provided herein is for automatically isolating security alerts of malicious attack from security alerts that correspond to undesirable, yet benign, activity in computer networks, cloud infrastructures, and SAAS applications. Additionally, the approach provides a method for qualitative contextual assessments of these alerts for threat responders. In some embodiments, the invention uses an ensemble of models based on pattern recognition and data modelling techniques. As the first step, each model in the ensemble uses the history of security events (alert history) on a computer network, cloud infrastructure, and/or SAAS applications to determine a new event (e.g., represented by a new alert) is relevant for security threat consideration. Based on evaluation using each model, as the second step, the ensemble then determines if the new event is malicious or benign by combining the results of the ensemble according to a rule and an evaluation criteria (e.g., a threshold).

In general, according to some embodiments, the approach provides an independent model of each common alert pattern and assigns a score to each alert. Specifically, each model defines a relevant scope and specific features of interest in the alert. The model is then used to compute a probability of the alert being malicious. Additionally, in some embodiments, the model then assigns the alert a quantitative score and a qualitative label describing the alert. Subsequently, the individual scores from each model are used to generate a final relevancy score that indicates if the alert is malicious or likely benign (e.g., noise).

Qualitative labels can be determined based on at least commonality or rarity of one or more features of the alert. For instance, if commonality (as determined by an adjustable threshold) for accounts/hosts/services can be used to provide a qualitative result. For instance, the alert might be of a type that is common for the computer network, might be common for a particular site, or might be common for a particular account, host, or service. Likewise, an alert that is rare (based on the same or a different threshold) could be used to generate a qualitative label indicated that the alert is a type that is rare for the computer network, rare for a particular site, or rare for a particular account, host, or service. In some embodiments, a determination is made fore each model as to which feature and characteristic is most relevant. Subsequently when the results of the models are combined a model is identified as being most significant/important to the final score. Then the qualitative information from that model is used as the basis of the qualitative label—e.g., the qualitative label indicating whether the alert is common or uncommon for a relevant class (alerts of the same type for all accounts and sites, alerts of the same type for a particular site, or alerts of the same type and for the same account). Furthermore, alerts having the same qualitative labels can be grouped together when presented to a user to enable the user to manage multiple alerts in the group in the same way that singular alerts are managed—e.g., to change a status to such as ignore, suppress, whitelist, etc. to all members in the group using a single action by that user.

Processing alerts using at least a portion of the approaches illustrated herein can be helpful at least due to the massive number of alerts modern networks generate which can easily overwhelm available resources should it be necessary to review all or even a significant subset of these alerts. However, many of these alerts are generally speaking undesirable but otherwise benign behavior and thus merely distracts from and obscures otherwise malicious activity. For example, undesirable but otherwise benign behavior might be the result of poorly written software applications, users with bad computer hygiene, or legacy devices, which are common causes of noisy alerts. Many of these situations cause threat detection systems to unintentionally trigger alerts that can be distracting or misleading for security experts. Given that there are a wide variety of reasons an alert can be falsely or undesirably triggered, the approach provided herein may model many of the common behaviors independently.

According to one embodiment, a first model analyzes alerts corresponding to the behavioral pattern of a specific device or user associated with an account. For example, an infrastructure vulnerability scanner that monitors key server ports is likely going to continually generate port sweep alerts on those ports. That scanner is associated with an account and will likewise be associated with corresponding alerts for that port sweep activity. Analysis using the first model might then be able to determine how relatively speaking common such alerts for the port sweep activity are for that account.

According to one embodiment, a second model comprises a site or organization specific model. For example, an organization with an extremely mobile sales operation with international presence can have multiple suspicious login alerts for employees connecting from varying countries. Such a model might then be able to analyze an alert and determine whether the alert is of a type that is relatively speaking common to the particular site. For example, those traveling user might commonly connect remotely (e.g., via a virtual private network, remote desktop client, or web-based user interface) to the site which would likely trigger corresponding alerts. However, depending of the particular network environment and organization or site, such behavior might be normal. Thus static rules applied to all may not be sufficient to identify this behavior as normal.

Similarly, a third model comprises a type-specific model that analyzes an alert based on its type. For example, an organization with an extremely mobile sales operation with international presence can have multiple suspicious login alerts for employees connecting from varying countries. As a result, such alerts may be of a type that is common for not just as particular site as discussed in the previous paragraph but also for all sites of a network.

Generally, each model works on one or more relevant features to determine respective values. For instance, features may comprise any value corresponding to an alert (e.g., included therein or associated with the alert). Each feature may be analyzed to determine its frequency and persistence. For instance, an IP address included in an alert might be used as a feature where a frequency and a persistence value are determined for that IP address. In some embodiments, a model may determine a noisiness and a popularity value for a type of alert. Additionally, for each feature, a corresponding probability might be computed—e.g., using a sigmoid function as discussed herein. Furthermore, frequency, persistence, noisiness, and popularity for respective parameter(s) might be as follows:

Frequency comprises a temporal value and is determined based on a number of time intervals in a window of time where the relevant parameter(s) of an alert match a corresponding stored alert and corresponds to a chance of the alert being triggered during any given time interval.

Persistence comprises a temporal value and is determined based on a number of time intervals since a first occurrence and a last occurrence in a window of time where the relevant parameter(s) of an alert match a corresponding stored alert and corresponds to a chance of the alert being triggered again during a period of time.

Noisiness comprises a spatial value and is determined based on the prevalence of a particular alert type for entities of interest and corresponds to a chance that the alert type will occur on any given entity.

Popularity comprises a spatial value and is determined based on the prevalence of that alert type across the customers network and corresponds to a chance that the alert type will occur on any entity.

Generally, any time interval that is less then or equal to a relevant window of time can be used. For instance, a time interval can comprise any number of seconds, minutes, hours, days, weeks, months, years etc. Likewise, a window of time may also comprise any number of seconds, minutes, hours, days, weeks, months, years etc. For examiner the time interval might comprise one minute while the time window comprises a single day, week, month, year, or multiple years. For simplicity the remainder of this document will presume that the time interval is a day while the window of time is an arbitrary number of days greater than one.

In some embodiments, frequency, persistence, noisiness, and popularity are determined using one or more respective sigmoid functions. In some embodiments, noisiness and/or popularity are determined based on a ratio. Generally, feature values as used herein are computed into independent probability measures (e.g., for frequency and persistence). Sigmoid functions are particularly useful here because they can take an unbounded numeric (e.g., a time interval) and convert it to a probability estimate. To put it simply, a sigmoid function can map a first value to a second value between 0 and 1 which can be treated as a probability. Additionally, a sigmoid function can be tailored to different features (selected parameters of an alert) by moving/offsetting the function along an axis (e.g., an x axis). In some embodiments, the sigmoid functions map lower numbers to higher probabilities and higher numbers to lower probabilities. Logically, this can be thought of as mapping rarely occurring alerts to higher probabilities that those alerts should be reviewed and commonly occurring alerts to lower probabilities that those alerts should be reviewed. However, in some embodiments, the arrangement could be flipped where lower probabilities indicate that those alerts likely cannot be safely ignored and higher probability indicate that those alerts likely can be safely ignored respectively. Additionally, use of the sigmoid functions also provides a benefit because it avoids a need to provide hard cutoff thresholds.

A sigmoid function might comprise the following:

$$\frac{1}{1+e^{\frac{x-10.5}{2}}} * \left(1 - e^{-5.25}\right) \qquad \text{Eq. 1}$$

Understandably different features may require different sigmoid parameters which are modelled based on data and domain expertise.

Generally, for each alert processed, the model computes probabilities for each of the relevant features. Once the probabilities are generated, the individual probabilities of each feature can be combined in various manners. Additionally, each model may use any combination of approaches to combine features, such as to generate a combined score. For instance, features may be combined using a union of probabilities, a minimum, a maxim, a mode, or mean. An illustration of the union of two probabilities (A and B) might look like the following A+B−A∩B, which may be computed by performing an addition of A and B (A+B) minus a multiplication of A times B (A*B). As used herein, a union of probabilities may be referred to as an "OR".

Subsequently, the corresponding result from each model may be combined to generate a final probability value using any of the approaches disclosed herein which may comprise a relevancy score or may be converted into a relevancy score. In some embodiments, the relevancy score comprises a probability that the alert corresponds to malicious or common behavior.

In some embodiments, a minimum or maximum probability is selected from the results of one of the models and used to represent the alerts relative significance. Additionally, the selected result may be used to postulate the qualitative nature of the alert—e.g., to provide a qualitative label indicating its nature such as indicating that it is a common alert, and the alert type or behavior characteristic corresponding to the alert possibly along with quantitative information). For instance, if an alert is determined to be widespread across the network it will likely be due to organization policies, whereas if the alert is localized to a single user and always uses the same app name and user agent then it is probably due to poorly written software or a configuration of that device. Such information may be used to postulate the nature of the corresponding alert. This qualitative distinction provides useful context to security responders. If a particular model has a significantly high prediction value of common behavior for the alert, the alert is labelled indicating this. For instance, if an alert has a high probability score from the model that looks for organization wide common patterns, then the alert will be labelled appropriately to contextualize this for a threat responder—e.g., by generating a qualitative label that represents the relative probabilistic determination of the model.

Generally, the approaches provided herein may be used to process alerts corresponding to accounts, hosts, and/or services which provide for an indication of essentially the abnormality of the corresponding activities and thus enables the identification of alerts that are more likely to be relevant to malicious behavior on the network. In some embodiments, the approaches provided herein are combined with prior techniques to all for white lists for alert to specify alerts that should always be reviewed.

In some embodiments, the approach automatically isolating malicious security alerts from benign alerts using an ensemble model of pattern recognition techniques. For example, the approach might comprising, maintaining an alert history comprising a plurality of stored alerts which is used to analyze a newly received alert which is processed using an ensemble of models, wherein the ensemble of models comprises two or more of an account-specific model, a site-specific model, and a type specific model, and the two or more of an account-specific model, a site-specific model, and a type-specific model each generate a model score. The results from each model can then be combined to generate a score for the new alert by combining model scores from the ensemble of models according to a set of logic, and finally applying a threshold to the score to determine handling of the new alert. In some embodiments, the ensemble of models comprises the account-specific model, the site-specific model, and the type specific model.

In some embodiments, the account-specific model analyzes the new alert against one or more stored alerts of the plurality of stored alerts of the alert history, and the one or more stored alerts and the new alert having the same alert type and corresponding to the same account. Similarly, the site-specific model analyzes the new alert against one or more stored alerts of the plurality of stored alerts of the alert history, and the one or more stored alerts and the new alert having the same alert type and corresponding to the same site. Finally, the type-specific model analyzes the new alert against one or more stored alerts of the plurality of stored alerts of the alert history, and the one or more stored alerts and the new alert having the same alert type.

In some embodiments, where a qualitative label is assigned to the new alert, the qualitative label being assigned based on at least a determination of which model is most significant for the score and whether the new alert is common or uncommon as determined by a threshold.

In some embodiments, alert handling comprises at least grouping the new alert with one or more other alerts having the same type and qualitative label. Furthermore, alerts in a group may be presented together where changes to a member of the group can be applied to all member of the group with a single action.

In some embodiments, the ensemble of models comprises sigmoid functions, and respective ones of the sigmoid functions are used to determine a frequency or persistence value of a corresponding feature in the new alert. Furthermore, the frequency or persistence values determined based on respective sigmoid functions may be combined to generate a single value for each model in the ensemble of models, and the frequency or persistence values are combined using any combination of a min, max, mean, mode, or a union of probabilities.

Approaches, are discussed below in the context of figures provided herein for purposes of illustration. In the following description, numerous specific details are set forth to provide a more thorough description of the specific examples described herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same number labels are used in different diagrams to refer to the same items.

In some embodiments, network token/authorization traffic is examined to learn the token/authorization behavior associated with accounts, hosts, and services of a network by a threat detection platform. For example, alerts may be generated by various modules on a network and indicate activity on a network for entities thereon (e.g., the accounts, hosts, or services). Such alerts may correspond to token/authorization requests/responses, to access of resources on a network, to movement of data on a network, and any other potentially relevant activities that are detectable from the hosts, services, and other resources on a network.

In some embodiments, a threat detection platform, or a part thereof, is at or connected to one or more switches or hosts operating an authentication service for capturing network token/authorization traffic. The threat detection platform can capture the network traffic by processing the traffic in line or by performing zero-load copy operation(s). Furthermore, in some embodiments, the threat detection platform processes authentication service logs. In some embodiment, the authentication service logs and the network token/authorization traffic are stitched together prior to processing. In some embodiments, service logs can be processed in place of and to the exclusion of network traffic by the threat detection platform.

FIG. 1 illustrates an example environment(s) in which some embodiments of the invention are implemented. The figure illustrates relationships between hosts, an authentication service, a threat detection platform, alert history storage, and resources.

As will be discussed further below, the threat detection platform operates on feature data transmitted over a network in alerts and/or extracted from network data such as token/authorization request/response data (see 152) and provided in one or more alerts. In some embodiments, the feature data comprises one or more of an account, a service, and a host associated with a particular access request of a plurality of access requests. Additional alerts can be provided by and transmitted over any number of modules on the network, such as on hosts, switches, firewalls, or at other services. The alerts can be maintained in a storage 130 comprising an alert history. The storage may comprise one or more devices which may be maintained separately or as part of a larger database. This historic information can be processed by the threat detection platform 112 to determine probabilities of relevance corresponding to respective alerts—e.g., based on information received as part of respective alerts in view of historical information maintained in the alert history over a corresponding period of time. In some embodiments, the alert history also includes information regarding qualitative labels for indicating a nature of an alert (e.g., of a corresponding type such as indicating that it is a common or rare alert, and the alert type or behavior characteristic corresponding to the alert possibly along with quantitative information to supports the systems determination). Such information may be used to postulate the nature of the corresponding alert. This qualitative distinction provides useful context to security responders. If a particular model has a significantly high prediction value of common behavior for the alert, the alert is labelled indicating this. For instance, if an alert has a high probability score from the model that looks for organization wide common patterns, then the alert will be labelled appropriately to contextualize this for a threat responder.

Generally, services correspond to resources in a network. For instance, resources 125 comprise any number of resources accessed by hosts on a network. Furthermore, resources may comprise both services and traditional resources. For instance, services include email services, Structure Query Language (SQL) based services, etc. hosted by one or more host(s) 111. Traditional resources comprise accessible file systems such as network-based file shares that are accessible on a file-by-file basis via protocols such as Common Internet File System (CIFS) or Server Message Block (SMB).

Access to the resources 125 is managed by an authentication service 122. In some embodiments, the authentication service 122 is implemented by one or more host(s) 110. The authentication service 122 maintains or has access to a dataset to determine which requests from which accounts should be provided a positive response (e.g., a token or authorization) to allow access to a requested resource. In some embodiments, the authentication service comprises a Microsoft "Active Directory" service or is accessible via the Kerberos authentication/authorization protocol, though one of ordinary skill in the art would understand that other similar services could be implemented.

To briefly illustrate, the Kerberos authentication protocol generally works as follows. The Kerberos architecture usually contains the following systems: a client account operating from a client host, a service hosted on a service host, and a Kerberos Domain Controller (KDC) (see e.g., authentication service 122), which holds keys it shares with each client and service. The first step is for an account to authenticate itself with a realm (which can be thought of as a namespace) managed by the KDC. Once authenticated, using the secret shared by the client account and the KDC, the KDC provides the client account with a session key and a ticket granting ticket (TGT). This session key can be used for a predefined length of time as a "passport" inside the network. The TGT is encrypted with the KDC master key and is later used by the KDC for service authorization. This encryption scheme allows for stateless distributed deployments of KDC infrastructure. When the client account needs to access a service/application/host, it sends the session key, the TGT, and an access request to the KDC for the service. The KDC can decrypt the TGT using its master key, thereby ensuring that the TGT is authentic. Having completed the authentication phase, the KDC can then perform the authorization phase, which determines whether the client is allowed to access a particular service. Once the request passes this check, the KDC can construct and send a ticket granting service (TGS) reply to the client that is encrypted with both the client account session key and the service session key. Once the client receives the TGS, it can start to communicate directly with the service/host. The client sends the part of the TGS that was encrypted by the KDC with session key to the service/host. Once the service/host has used its own session key with KDC to verify the validity of the TGS, it knows that KDC has approved the client account to access the service it provides, and then gives access to the service to client account.

Communications between the authentication service and the host(s) 104*a-n* are exchanged over one or more switches 106. Generally, these communications are initiated by the host(s) 104*a-n*. A client host transmits a token/authorization request (see 152) on behalf of an account to the authentication service over one or more switches 106. The authentication service 122 will process the token/authorization request (see 152) to determine whether a token or authorization should be provided to the host. Depending on the result of that determination, the authentication service 122 will return a denial or a token/authorization granting the requested access (see 152). If the token is provided to the host, (e.g., a host of host(s) 104*a-n*) the host will use the token/authorization to access the internal network resource 125 at 156.

In some embodiments, the threat detection platform 112 includes a sensing module(s) for capturing network activity which may include token/authorization requests and/or responses at 153 from one or more of switches 106 or authentication service 122. For instance, the threat detection platform 112, includes multiple distributed sensing modules (taps) located at different locations (e.g., switch(es) 106 and/or authentication service 122 host(s) 110). The sensing modules can identify relevant information for use by the remainder of the threat detection platform 112—e.g., process activity to determine whether an alert should be generated, and if so generates such an alert which may include information such as a host corresponding to the request, a requested service, the associated account, a corresponding protocol, whether the communication is a request or a response, whether the request was granted or denied, the time of the request/response, or any other relevant information. In some embodiments, the sensing module(s) are not part of the threat detection platform but are otherwise used to capture relevant information that is then provided for use by the threat detection platform 112 in one or more alerts.

In some embodiments, only requests or responses are captured at 153. In some embodiments, both requests and responses are captured. Furthermore, in some embodiments, the threat detection platform 112 processes authentication service logs, (see 154) to generate one or more alerts. Usually, most token/authorization requests will occur directly over the internal network and thus be identifiable directly from network packets at one or more network devices (e.g., switches 106, or from host(s) 110 of authentication service 122). However, some requests will occur over encrypted connections (e.g., secure shell (SSH) or remote desktop protocol (RDP)) and can't be captured merely by observing packets at network devices. Instead, these encrypted connection authorization requests and responses are logged by the authentication service 122. Thus, the encrypted connection authorization requests and responses can be processed by parsing the authentication service log(s) at 154 to generate alerts. In some embodiments, authentication service logs are aggregated at a log collector (not illustrated) prior to being provided to the threat detection platform 112. In some embodiments, the authentication service log(s) are compared to previously captured network activity to remove/exclude duplicate communications and thus avoid performing unnecessary analysis corresponding to the same request and/or response twice.

In some embodiments, the threat detection platform 112 is provided on one or more host(s) 110 of the authentication service 122, on one or more separate hosts, on the switch(es) 106, or any combination thereof. Further discussion of the operation of the threat detection platform 112 is provided below.

Figure 2:
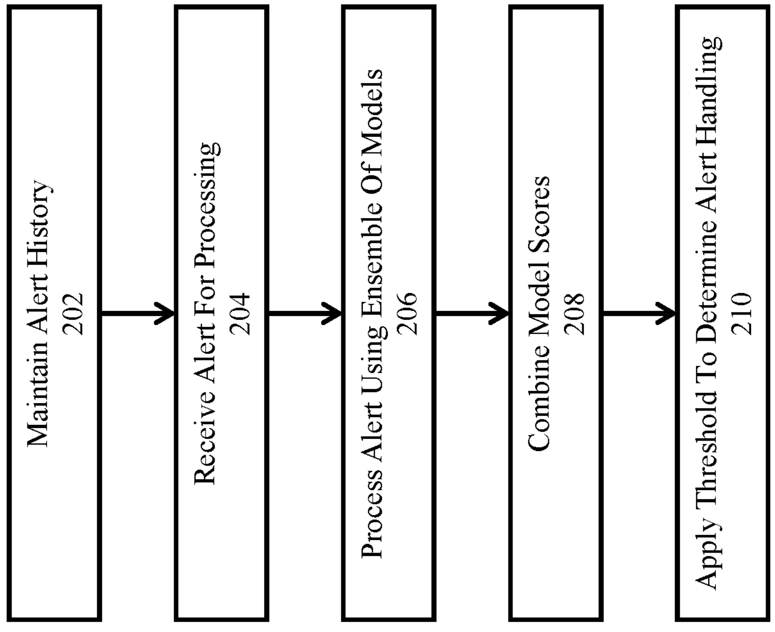
FIG. 2 illustrates a process flow according to some embodiments of the invention.

FIG. 2 illustrates a process flow according to some embodiments of the invention. Briefly, the process flow will maintain a history of alerts, which are to be analyzed when an alert is received for processing.

Generally, the process starts by maintain an alert history (see 202). For instance, each alert, or a collection of information thereof, received over a given period of time is maintained/stored in a database or other storage facility (see e.g., alert history 130). Such information may be maintained in a list, a linked list, a collection of database entries, a table, or a file. Each alert will have one or more features that can be captured and maintained for future matching analysis. Additionally, different alert types may include different features. Regardless of the form used to maintain the alert history, data therein is processable by the threat detection platform to enable analysis corresponding to received alerts.

At 204 an alert is received for processing. For instance, an alert might comprise a sign-on notification for a user and include information such as a source IP a destination IP address, a username, whether that request was granted or denied, or any other relevant information. Each piece of information for an alert can be used as a feature for analysis as provided herein. Generally, such alerts are well known in the security space and any known arrangement for generating and collection alerts could be utilized herein. Thus, there may be multiple different types of alerts with different combinations of features.

At 206, the alert is processed using an ensemble of models. This will be discussed further in regard to FIGS. 3-4C. Briefly, the approach provided herein uses multiple different models to generate results (e.g., scores) which can be processed in various ways to determine or select a score for assignment to the alert by each respective model. Essentially the process will use up to three models to convert the relevant occurrences of the feature into a relative probability. For instance, various features might be analyzed to generate a frequency and persistence score for each one of the various features in an alert or a subset therein. Subsequently, these scores can be combined in various manners to generate a final score for the alert from each model. In some embodiments, at least one model also generates determines a noisiness or popularity value for an alert.

Once each model in the ensemble of models completes the generation of a result (e.g., a score or prediction of importance, they are combined at 208. Generally, the combination logic for 208 will determine which score to select and/or how to combine the values. For instance, a minimum score could be selected. As provided herein, the individual models (as will be discussed below) according to a preferred embodiment are configured to provide the most conservative (risk averse) results. Thus, when combining models, to balance the highly conservative approach for the individual models, the minimum value is selected which corresponds to the least perceived risk presented by the alert. However, other approaches could be utilized here such as selecting a maximum, a mean, or a mode.

At 210 a threshold is applied to determine alert handling. For example, a threshold could be set at a static value e.g., suppress anything below 0.25. Alternatively, the threshold could comprise a dynamic value. For example, a value base on the total number of alters that have not been suppressed (e.g., a value that could be used to present x alerts per minute, hour, day) where as the number of alerts increases, the threshold could be increased to keep the flow of alerts that are not suppressed relatively stable. In some embodiments, the alerts that are similarly characterized (e.g., based on a qualitative label) can be grouped when provided as results to save time. For example, each alert may be processed to determine whether it should be isolated or not. If an alert is to be isolated it might be grouped with other alerts that are also isolated or to be isolated. If an alert is determined to be isolated, (e.g., because it is a sign-on attempt that appears to be normal behavior as indicated by a combined score that is below a given threshold) then a reason for the characterization might also be identified (e.g., the alert or group of alerts is labeled as "normal" or "normal sign-on"). For instance, the model selected (or results thereof) for the final result might be the model with the minimum score from the ensemble of models and a qualitative reason could be provided that corresponds to the selected model. Specifically, when the selected model for the final result is an account-specific model a message might indicate that the "action appears to be normal for this account", for a site-specific model a message might indicate that the "action appears to be normal at this site", and for a type-specific model a message might indicate that the "action appears to be of a type that is common". In this way, alerts can be processed for presentation to a person skilled in security management for review—where relatively speaking common alerts are separated from the uncommon alerts and in some embodiments where alerts are grouped when they are determined to have the some controlling characteristics for a specific determination. For example, the alerts that are determined to be the most uncommon are presented first with more common alerts being arranged in a matter that de-emphasizes those alerts (e.g., the alert or group do alerts is arranged in a manner based on there commonality). In some embodiments, the alerts are presented in groups where possible with a number indicating a number of alerts that have been included in said groups. This allows an administrator to quickly assess which alerts should be review prior to other alerts.

Figure 3:
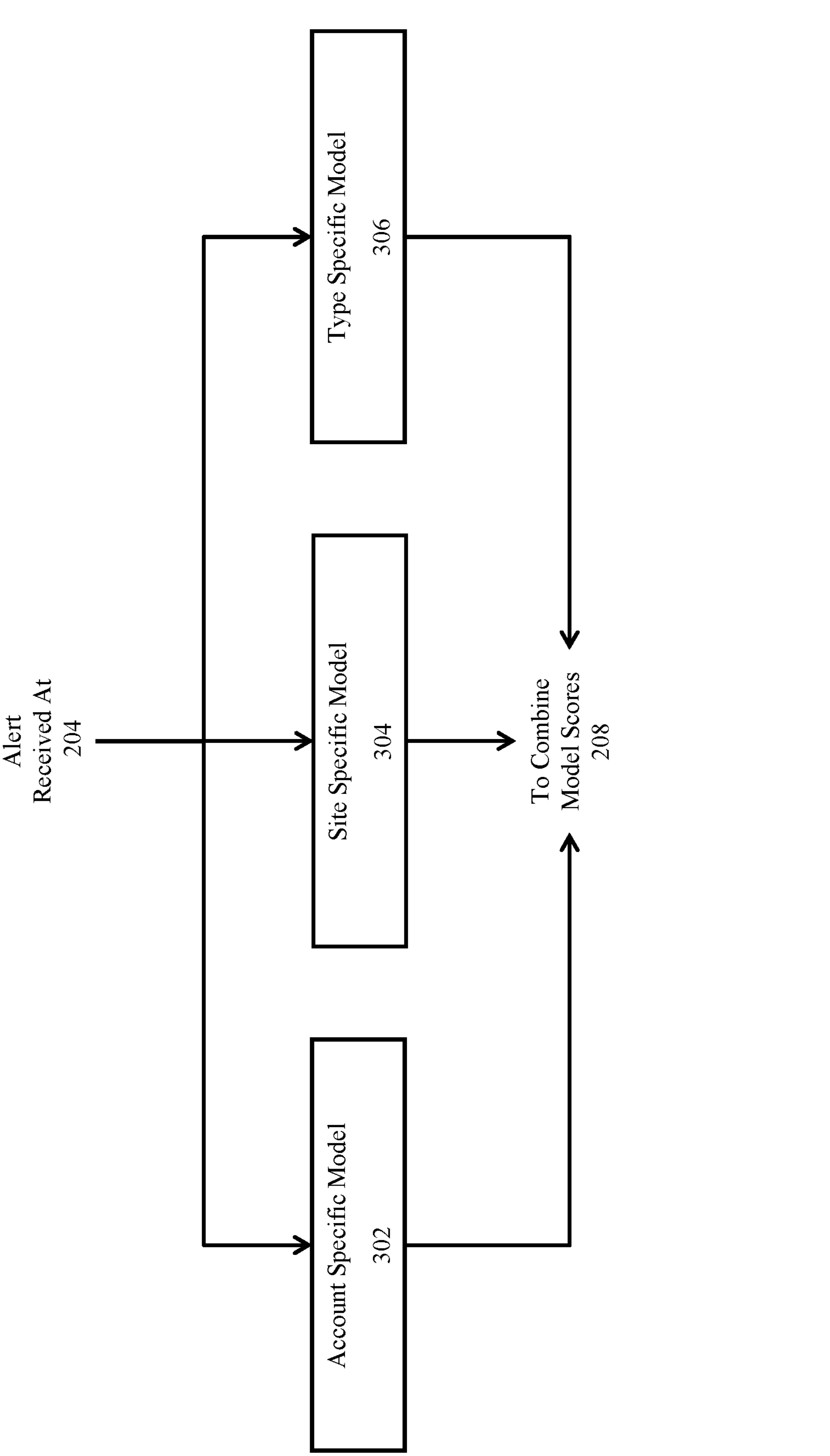
FIG. 3 illustrates an expanded view of processing alerts using an ensemble of models according to some embodiments of the invention.

FIG. 3 illustrates an expanded view of processing alerts using an ensemble of models according to some embodiments of the invention.

As illustrated, the primary embodiment includes three models, each different from the others. The first model, the account-specific model 302, processes alerts based on data previously received for the same account. For instance, any sign-on attempts by a particular user are used to determine whether a subsequent sign-on is normal for the particular user as represented by the output of the model. Note that user and account are largely interchangeable, though an account could be used by a device, host, or service as well. Generally, the account-specific model compares a received alert against alerts of the same type for the same user. The second model, the site-specific model 304, is similar to the account-specific model, but is not limited to data for the same user. Instead, the site-specific model considers any alerts of the same type and corresponding to the same site, of which an organization may have multiple, as the alert under analysis when evaluating that alert. The third model, the type-specific model 306, considers only the type of the alert that is issued to determine various information—e.g., ignores the account and site of the alert by analyzing an alert in comparison to all alerts of the same type. A discussion of example embodiments, is provided in FIGS. 4A-4C

Figure 4A:
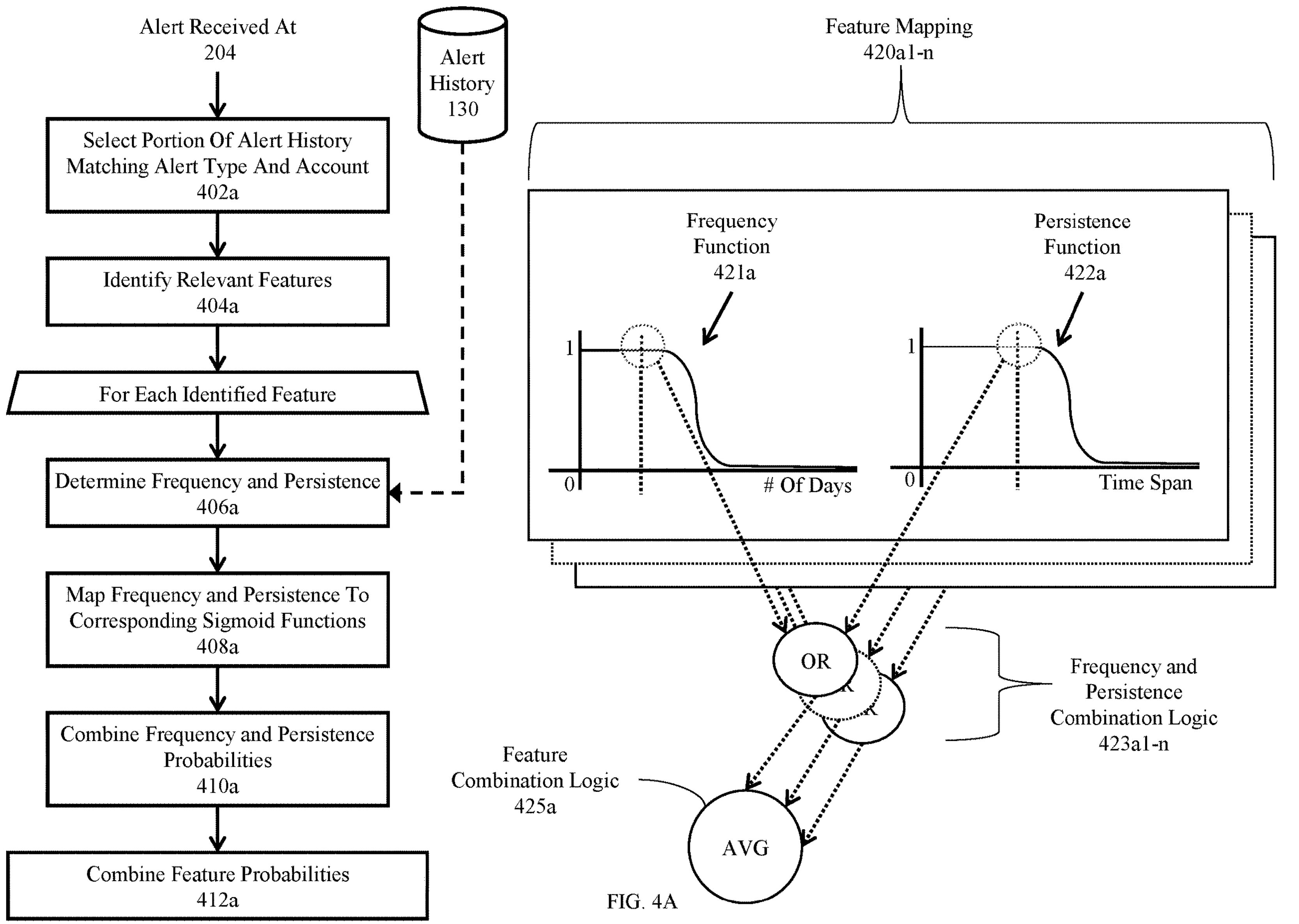
FIG. 4A illustrates an expanded view of an account-specific model according to some embodiments of the invention.

FIG. 4A illustrates an expanded view of an account-specific model according to some embodiments of the invention.

Generally, the processing starts at **402*a*** where alert history is processed to select the corresponding data. Here the corresponding data is alerts that have the same alert type and account as the alert being analyzed—essentially this compares the current activity of an account to the past activity of the same account. In some embodiments, this information is limited only by what is maintained in the alert history. In other embodiments, this information is limited to alerts received during a specific time window. In some embodiments, received alerts are added to the alert history prior to their analysis, whereas in others the alert is added to the alert history after processing.

At **404*a* relevant features are identified. For instance, for a sign-on attempt the relevant features might comprise the IP address of the requestor and the IP address of the resource being requested. In some embodiments, the relevant features are identified by an expert in the field or other security professional. In some embodiment, features may be identified based on their commonality (e.g., features are identified as relevant when they are known to have a threshold rate of occurrence in values such as through analysis of stored alert history). Additionally, one or more other features could be identified as relevant to the extent they are included in the alert history and can therefore be compared. A source IP might be mappable to a device assigned to a particular user (e.g., the user associated with the account) while a destination IP might be mappable to a software (e.g., outlook server). Other information might comprise a port or information that identifies, or can be used to identify, an application that caused the request (e.g., Application IP). Regardless of which features are identified, each so identified feature is then selected and processed at described in regard to 406*a*, 408*a* and 410*a*** to generate a frequency and persistence value for each identified feature and to combine those values according to a rule.

First, at **406*a*, a frequency and persistence value are determined for a selected feature of the alert. For example, the frequency might comprise the number of days in which a matched feature (e.g., the same feature value for the feature) was found in an alert of the same type and corresponding to the same account. Whereas, the persistence might comprise the number of days between the first/earliest and last/latest occurrence (inclusive or non-inclusive) of the matched feature in other alerts of the same type and account. Table 1 below provides an illustration of an illustrative alert history from the alert history storage 130**. While there are many different types of alerts and different information which may be provided by each, we limit this example to suspicious sign-ons for simplicity. As can be seen in Table 1, each alert has a corresponding identifier, alert type, account, IP address, Application ID, and date.

TABLE 1

| Identifier | Alert Type | Account | IP | Application ID | Date |
|---|---|---|---|---|---|
| A1 | Suspicious Sign-on | Himmanshu | 193.0.0.1 | Outlook | Nov. 3, 2022 |
| A2 | Suspicious Sign-on | Irina | 191.0.0.1 | Outlook | Nov. 25, 2022 |
| A3 | Suspicious Sign-on | Joe | 11.0.0.1 | Chrome | Nov. 28, 2022 |
| A4 | Suspicious Sign-on | Himmanshu | 193.0.0.1 | Outlook | Nov. 28, 2022 |
| A5 | Suspicious Sign-on | Himmanshu | 11.0.0.1 | Chrome | Dec. 1, 2022 |
| A6 | Suspicious Sign-on | Himmanshu | 193.0.0.1 | Outlook | Dec. 3, 2022 |
| A7 | Suspicious Sign-on | Irina | 193.0.0.1 | Outlook | Dec. 5, 2022 |

Suppose that the alert being analyzed is a suspicious sign-on by Himmanshu on IP 193.0.0.1, using outlook. The frequency can be determined as follows: for the IP address the frequency is 3 days as indicated by the date fields in the rows having the indicated IP address (see A1, A4, and A6). Using the table again, the persistence can be determined for the IP address as the number of days from 11/3/2022 to 12/3/2022 which is 30 days (see A1 and A6) that the IP address was previously associated with an alert of the same type for the indicated account. Similarly, if the application ID (outlook) is identified as a feature, the frequency and persistence could be calculated for the application ID which would correspond to a frequency of 3 days (see A1, A4, A6) and a persistence of 30 days (see A1 and A6).

Once the frequency and persistence are determined for a respective feature, the frequency and persistence values are mapped to a corresponding sigmoid function at 408*a* (see also eq1 and feature mapping 420*a*1-*n*). For example, the determined frequency is mapped to the frequency function 421*a* which is a sigmoid function calibrated for determining the frequency contribution for the particular alert type and feature. Similarly, the determined persistence is mapped to a persistence function 422*a* which is a sigmoid function calibrated for determining the persistence contribution for the particular alert type and feature.

In some embodiments, each pair of frequency and persistence outputs are then combined at 410*a* using an OR function—e.g., performing an addition of A and B (A+B) minus a multiplication of A times B (A*B). In some embodiments, a min, max, or mean approach is used to combine the frequency and persistence probabilities instead of the OR function. In some embodiments, a different set of logic is used to determine how to combine the frequency and persistence mapping results, which may be specified by a user.

At 412*a* the results for each feature (see 423*a*1-*n*) are combined. As illustrated here (see 425*a*), the combination of each is combined by averaging, though any of the other approaches described herein could be used.

Figure 4B:
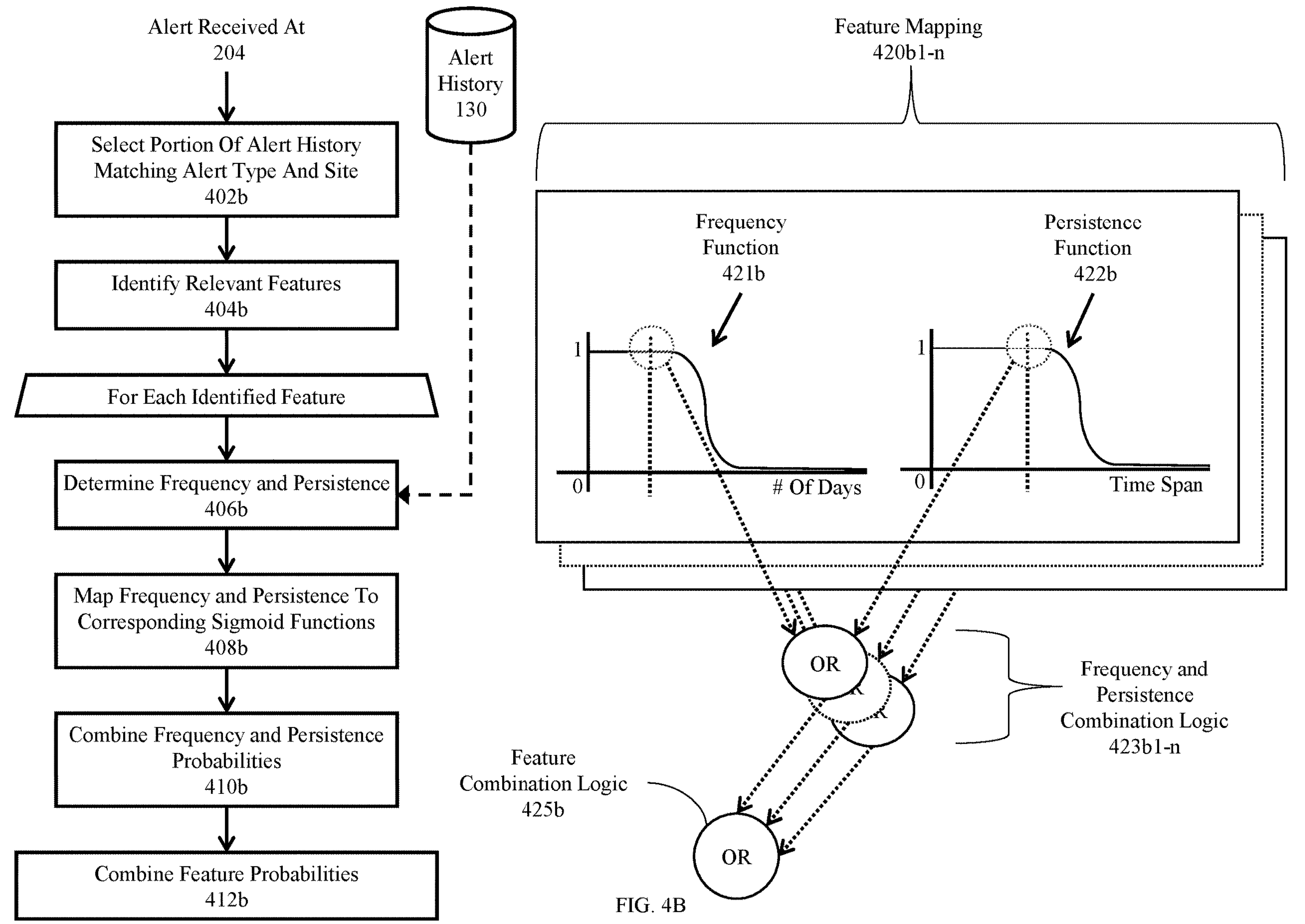
FIG. 4B illustrates an expanded view of a site-specific model according to some embodiments of the invention.

FIG. 4B illustrates an expanded view of a site-specific model according to some embodiments of the invention. The approach illustrated in FIG. 4B is largely the same as that illustrated in FIG. 4A. Thus, the description of 402*a*, 404*a*, 406*a*, 408*a*, 410*a*, 420*a*1-*n*, 421*a*, 422*a*, and 423*a*1-*n* apply to 402*b*, 404*b*, 406*b*, 408*b*, 410*b*, 420*b*1-*n*, 421*b*, 422*b*, and 423*b*1-*n* except that the data that is relevant is different.

Thus, instead of identifying alerts as relevant when they match the account and alert type of an alert being analyzed, the alerts are identified as relevant when they match the alert type and site of the alert being analyzed. In some embodiments, an organization is used in place of, or synonymously with, a site when an organization only has one site. Thus, the relevant data used for the comparison in FIG. 4B is generally going to be larger than that corresponding to FIG. 4A as FIG. 4A is generally directed towards what is normal for a particular user, whereas FIG. 4B is generally directed towards what is normal for essentially all users of a particular site. Thus, when comparing an alert being analyzed to alerts that were previously capture (e.g., in the alert history), at 402*b* if the alert type and site of a new alert match that of a previously captured alert, the previously captured alert is considered to be matching and is selected for analysis.

For example, using the same alert and table 1 provided above, and where the table is for a single site, the frequency for the IP address feature of the suspicious sign-on would be found to be 4 days (see A1, A4, A6, and A7). Using the table again, we can determine that the persistence of the IP address is the number of days from 11/3/2022 to 12/5/2022 which is 32 days (see A1 and A7). Similarly, frequency and persistence could be calculated for the application ID which would correspond to a frequency of 5 days (see A1, A2, A4, A6, and A7) and a persistence of 32 days (see A1 and A7).

With regard to combining feature probabilities at 412*b*, instead of using an average function, an OR is used. See 425*b* illustrating that the result from the site-specific model is the OR'd result of all OR'd values from the feature mapping (see 423*b*1-*n*).

Figure 4C:
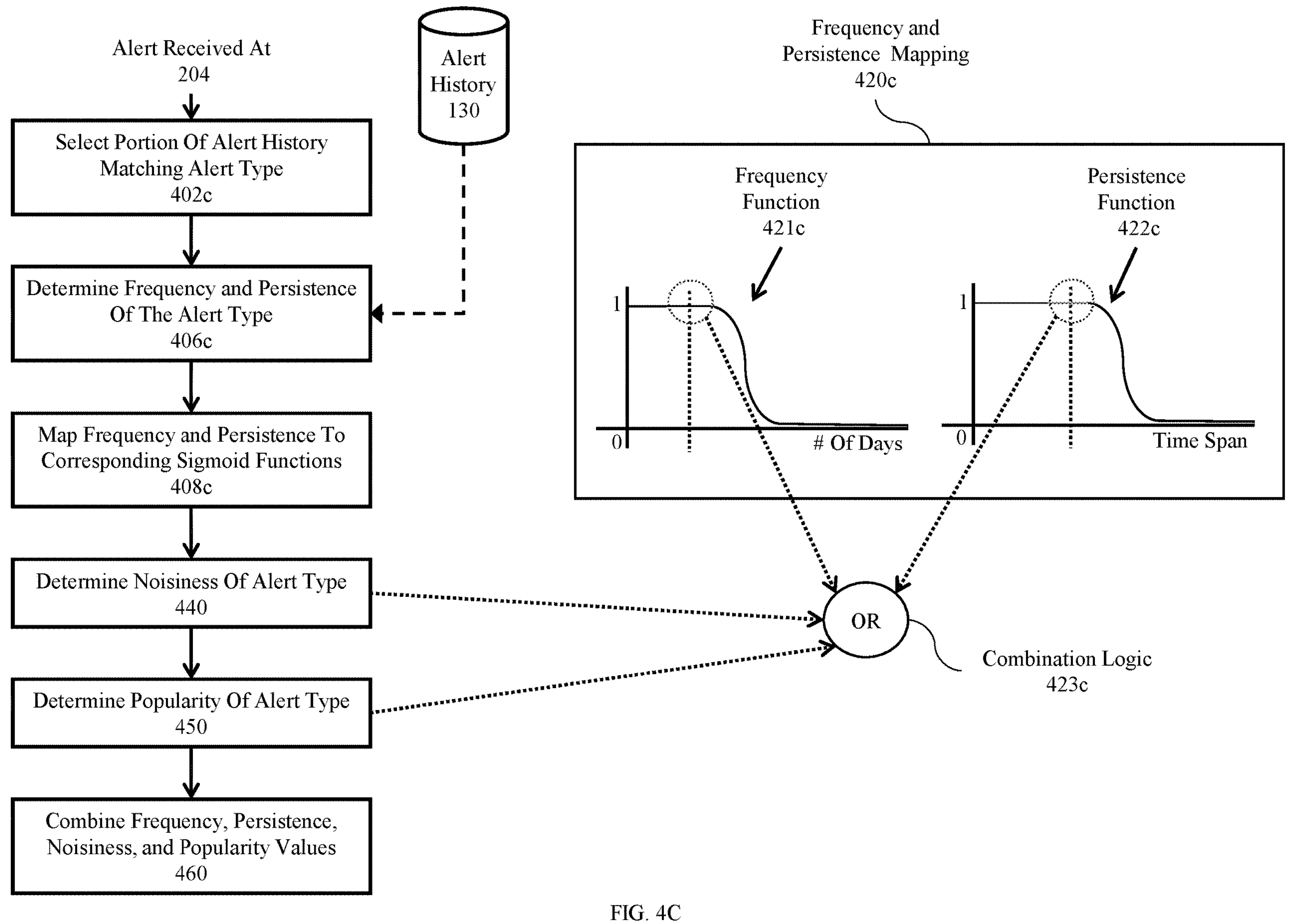
FIG. 4C illustrates an expanded view of a type-specific model according to some embodiments of the invention.

FIG. 4C illustrates an expanded view of a type-specific model according to some embodiments of the invention.

Generally, the processing starts at 402*c* where the alert history is processed to select the corresponding data. Here the corresponding data is alerts that have the same alert type as an alert received for analysis. In some embodiments, this information is limited only by what is maintained in the alert history. In other embodiments, this information is limited to alerts received during a specific time window. In some embodiments, received alerts are added to the alert history prior to their analysis, whereas in others the alert is added to the alert history after processing. As this model matches to all alerts of the same type, the number of alerts in the alert history should be equal to if not greater than the number of alerts that where selected for the account-specific model and for the site-specific model. Because this model is only concerned with whether or not an alert of a specific type occurred during a relevant period of time, this occurrence is treated as the feature to be analyzed.

At 406*a*, a frequency and persistence value may be determined for the alert. For example, the frequency might comprise the number of days in which an alert of the same type was found. The persistence might comprise the number of days between the first and last occurrence of the matching alert type. Using the same alert and table 1 discussed above comprising a suspicious sign-on, we can determine the frequency of that alert type is 6 days (see A1-A7). Since A3 and A4 correspond to the same day, only the first encountered occurrence is used as a basis to increases the frequency. Using the table again, we can determine that the persistence of the alert type corresponds to Nov. 3, 2022 to Dec. 5, 2022 which is 32 days (see A1 and A7).

Once the frequency and persistence are determined for the alert type, they are mapped to corresponding sigmoid functions at 408*c* (see also eq1 and feature mapping 420*c*). For example, the determined frequency is mapped to the frequency function 421*c* which is a sigmoid function calibrated for determining the frequency contribution for the particular alert type. Similarly, the determined persistence is mapped to a persistence function 422*c* which is a sigmoid function calibrated for determining the persistence contribution for the particular alert type.

At 440 a noisiness of the alert type is determined. For instance, the noisiness might comprise a number of accounts that trigger the alert type divided by the number of accounts that trigger any alerts. For the sake illustration, lets presume that there are 100 accounts that triggered an alert of any type in the alert history though realistically there will be many more. Then the noisiness might comprise 3/100 or 0.03 as there are three accounts (see table 1 Account column including Himmanshu, Irina, and Joe) that triggered an alert of the indicated type. In some embodiments, this number could be used directly. However, in a preferred embodiment, this number would also be used as an input to a sigmoid function specifically calibrated for this alert type or model (not illustrated). Thus, 0.03 would in input into the sigmoid function and a corresponding result would be provided.

At 450 a popularity of the alert is determined. Here the popularity is based on the number of accounts that triggered the alert type. However, instead of using a ratio, the popularity might be computed by taking a log of the number of alerts of that type (see A1-A7 for alerts of that type) for the given time period. As with 440 this would preferably be fed into a specifically calibrated sigmoid function.

Once all the values are determined (see 408*c* 440, and 450) they are combined at 460. For instance, as illustrated here, the outputs could be combined at 460 using an or function as discussed above. In some embodiments, an min, max, or mean approach is used to combine the frequency and persistence probabilities.

Subsequently, the results from each model can be processed as discussed above in regard to 208 and the alerts can be handles accordingly such as discussed in regard to 210.

System Architecture Overview

Figure 5:
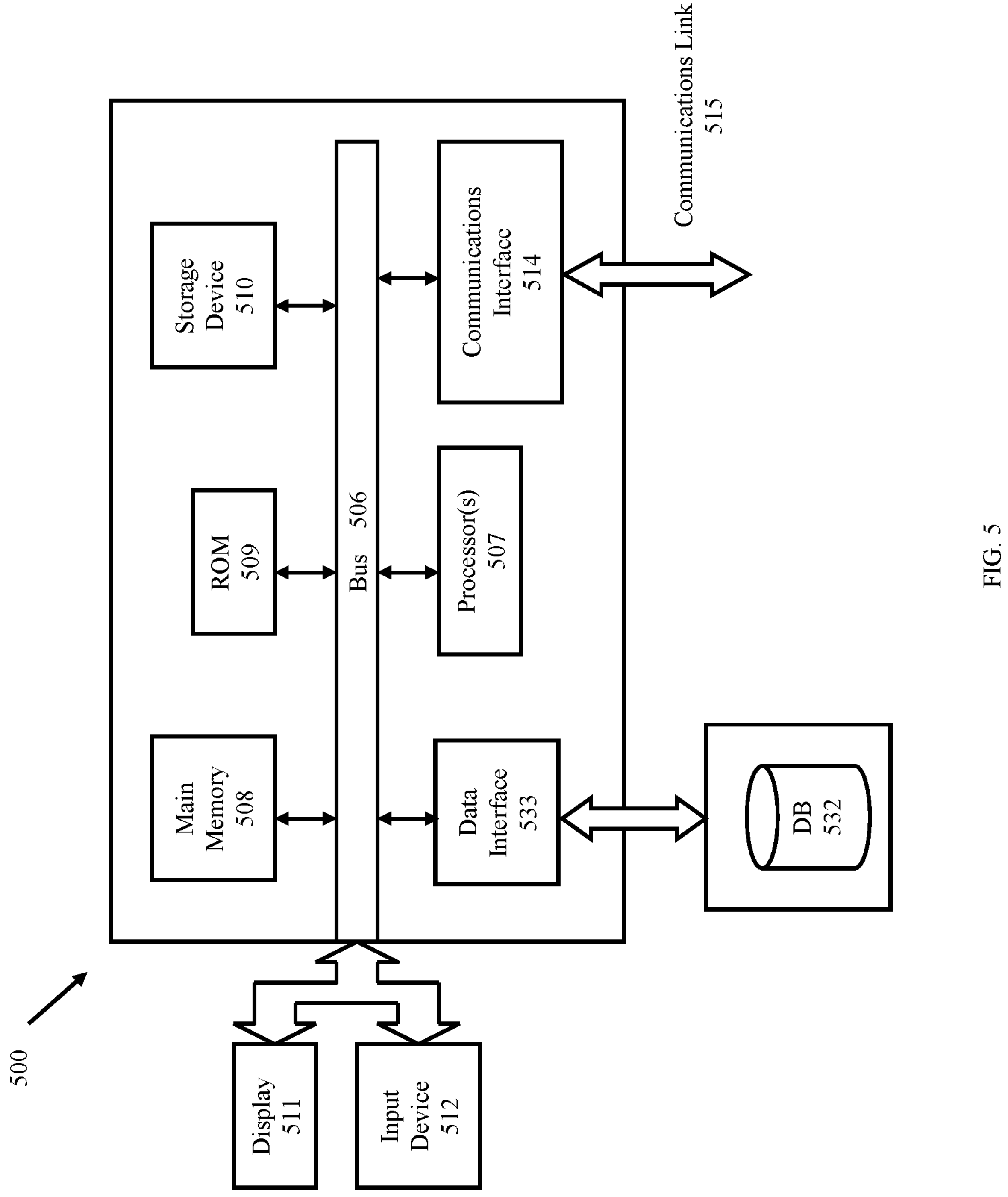
FIG. 5 is a block diagram of an illustrative computing system suitable for implementing an embodiment of the present invention.

FIG. 5 is a block diagram of an illustrative computing system 500 suitable for implementing an embodiment of the present invention. Computer system 500 includes a bus 506 or other communication mechanism for communicating information, which interconnects subsystems and devices, such as processor 507, system memory 508 (e.g., RAM), static storage device 509 (e.g., ROM), disk drive 510 (e.g., magnetic or optical), communication interface 514 (e.g., modem or Ethernet card), display 511 (e.g., CRT or LCD), input device 512 (e.g., keyboard), and cursor control.

According to one embodiment of the invention, computer system 500 performs specific operations by processor 507 executing one or more sequences of one or more instructions contained in system memory 508. Such instructions may be read into system memory 508 from another computer readable/usable medium, such as static storage device 509 or disk drive 510. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 507 for execution. Such a medium may take many forms, including but not limited to, non-volatile media and volatile media. Non-volatile media includes, for example, optical or magnetic disks, such as disk drive 510. Volatile media includes dynamic memory, such as system memory 508.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 500. According to other embodiments of the invention, two or more computer systems 500 coupled by communication link 515 (e.g., LAN, PTSN, or wireless network) may perform the sequence of instructions required to practice the invention in coordination with one another.

Computer system 500 may transmit and receive messages, data, and instructions, including program, e.g., application code, through communication link 515 and communication interface 514. Received program code may be executed by processor 507 as it is received, and/or stored in disk drive 510, or other non-volatile storage for later execution. Computer system 500 may communicate through a data interface 533 to a database 532 on an external storage device 531.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method for automatically isolating malicious security alerts from benign alerts using an ensemble model of pattern recognition techniques, comprising:

maintaining an alert history comprising a plurality of stored alerts;

receiving a new alert;

processing the new alert using an ensemble of models, wherein the ensemble of models comprises two or more of an account-specific model, a site-specific model, and a type-specific model, the account-specific model processes alerts of a single alert type that correspond to an account of the account-specific model, the site-specific model processes alerts of the single alert type that correspond to the same site as the site-specific model, the type-specific model processes alerts of the single alert type, and the two or more of an account-specific model, a site-specific model, and a type-specific model each generate a model score;

generating a score for the new alert by combining model scores from the ensemble of models according to a set of logic; and determining a handling of the new alert based on application of a threshold to the score.

2. The method of claim 1, wherein the ensemble of models comprises the account-specific model, the site-specific model, and the type-specific model.

3. The method of claim 1, wherein the account-specific model analyzes the new alert against one or more stored alerts of the plurality of stored alerts of the alert history, and the one or more stored alerts and the new alert having the same alert type and correspond to the same account.

4. The method of claim 1, wherein the site-specific model analyzes the new alert against one or more stored alerts of the plurality of stored alerts of the alert history, and the one or more stored alerts and the new alert having the same alert type and corresponding to the same site.

5. The method of claim 1, wherein the type-specific model analyzes the new alert against one or more stored alerts of the plurality of stored alerts of the alert history, and the one or more stored alerts and the new alert having the same alert type.

6. The method of claim 1, wherein a qualitative label is assigned to the new alert, the qualitative label being assigned based on at least a determination of which model is most significant for the score and whether the new alert is common or uncommon as determined by a threshold.

7. The method of claim 6, wherein alert handling comprises at least grouping the new alert with one or more other alerts having the same type and qualitative label.

8. The method of claim 7, wherein alerts in a group are presented together and changes to a member of the group can be applied to all members of the group with a single action.

9. The method of claim 1, wherein the ensemble of models comprises sigmoid functions, and respective ones of the sigmoid functions are used to determine a frequency or persistence value of a corresponding feature in the new alert.

10. The method of claim 9, wherein frequency or persistence values determined based on respective sigmoid functions are combined to generate a single value for each model in the ensemble of models, and the frequency or persistence values are combined using any combination of a min, max, mean, mode, or a union of probabilities.

11. A non-transitory computer readable medium having stored thereon a set of instructions, the set of instructions, when executed by a processor, causing a set of acts for automatically isolating malicious security alerts from benign alerts using an ensemble model of pattern recognition techniques, the set of acts comprising:

maintaining an alert history comprising a plurality of stored alerts;

receiving a new alert;

processing the new alert using an ensemble of models, wherein the ensemble of models comprises two or more of an account-specific model, a site-specific model, and a type-specific model, the account-specific model processes alerts of a single alert type that correspond to an account of the account-specific model, the site-specific model processes alerts of the single alert type that correspond to the same site as the site-specific model, the type-specific model processes alerts of the single alert type, and the two or more of an account-specific model, a site-specific model, and a type-specific model each generate a model score;

generating a score for the new alert by combining model scores from the ensemble of models according to a set of logic; and determining a handling of the new alert based on application of a threshold to the score.

12. The non-transitory computer readable medium of claim 11, wherein the ensemble of models comprises the account-specific model, the site-specific model, and the type-specific model.

13. The non-transitory computer readable medium of claim 11, wherein the account-specific model analyzes the new alert against one or more stored alerts of the plurality of stored alerts of the alert history, and the one or more stored alerts and the new alert having the same alert type and correspond to the same account.

14. The non-transitory computer readable medium of claim 11, wherein the site-specific model analyzes the new alert against one or more stored alerts of the plurality of stored alerts of the alert history, and the one or more stored alerts and the new alert having the same alert type and corresponding to the same site.

15. The non-transitory computer readable medium of claim 11, wherein the type-specific model analyzes the new alert against one or more stored alerts of the plurality of stored alerts of the alert history, and the one or more stored alerts and the new alert having the same alert type.

16. The non-transitory computer readable medium of claim 11, wherein a qualitative label is assigned to the new alert, the qualitative label being assigned based on at least a determination of which model is most significant for the score and whether the new alert is common or uncommon as determined by a threshold, alert handling comprises at least grouping the new alert with one or more other alerts having the same type and qualitative label, and alerts in a group are presented together where changes to a member of the group can be applied to all members of the group with a single action.

17. The non-transitory computer readable medium of claim 11, wherein the ensemble of models comprises sigmoid functions, and respective ones of the sigmoid functions are used to determine a frequency or persistence value of a corresponding feature in the new alert, and frequency or persistence values determined based on respective sigmoid functions are combined to generate a single value for each model in the ensemble of models, and the frequency or persistence values are combined using any combination of a min, max, mean, mode, or a union of probabilities.

18. A computing system for automatically isolating malicious security alerts from benign alerts using an ensemble model of pattern recognition techniques comprising:

a memory storing a set of instructions; and a processor to execute the set of instructions to perform a set of acts comprising:

maintaining an alert history comprising a plurality of stored alerts;

receiving a new alert;

processing the new alert using an ensemble of models, wherein the ensemble of models comprises two or more of an account-specific model, a site-specific model, and a type-specific model, the account-specific model processes alerts of a single alert type that correspond to an account of the account-specific model, the site-specific model processes alerts of the single alert type that correspond to the same site as the site-specific model, the type-specific model processes alerts of the single alert type, and the two or more of an account-specific model, a site-specific model, and a type-specific model each generate a model score;

generating a score for the new alert by combining model scores from the ensemble of models according to a set of logic; and determining a handling of the new alert based on application of a threshold to the score.

19. The computing system of claim 18, wherein the ensemble of models comprises the account-specific model, the site-specific model, and the type-specific model.

20. The computing system of claim 18, wherein the account-specific model analyzes the new alert against one or more stored alerts of the plurality of stored alerts of the alert history, and the one or more stored alerts and the new alert having the same alert type and correspond to the same account; the site-specific model analyzes the new alert against one or more stored alerts of the plurality of stored alerts of the alert history, and the one or more stored alerts and the new alert having the same alert type and corresponding to the same site; and the type-specific model analyzes the new alert against one or more stored alerts of the plurality of stored alerts of the alert history, and the one or more stored alerts and the new alert having the same alert type.

* * * * *